US011223212B2

(12) United States Patent
Akaishi et al.

(10) Patent No.: US 11,223,212 B2
(45) Date of Patent: Jan. 11, 2022

(54) BATTERY CONTROL DEVICE FOR HOMOGENIZING BATTERY CELLS

(71) Applicant: TOYOTA JIDOSHA KABUSHIKI KAISHA, Toyota (JP)

(72) Inventors: Takayuki Akaishi, Toyota (JP); Yuhki Shiozumi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 16/562,799

(22) Filed: Sep. 6, 2019

(65) Prior Publication Data

US 2020/0136399 A1 Apr. 30, 2020

(30) Foreign Application Priority Data

Oct. 26, 2018 (JP) .............................. JP2018-202098

(51) Int. Cl.
*H02J 7/00* (2006.01)

(52) U.S. Cl.
CPC .......... *H02J 7/0014* (2013.01); *H02J 7/0021* (2013.01)

(58) Field of Classification Search
CPC ... H02J 7/0014; H02J 7/0021; H02J 7/007186
USPC ....................................................... 320/134
See application file for complete search history.

(56) References Cited

U.S. PATENT DOCUMENTS

| 5,387,857 | A | * | 2/1995 | Honda | ................... | H02J 7/0016 320/120 |
| 5,504,415 | A | * | 4/1996 | Podrazhansky | ....... | H02J 7/0016 320/118 |
| 6,020,743 | A | * | 2/2000 | Reeves | ............ | G01R 19/16542 324/434 |
| 8,203,309 | B2 | * | 6/2012 | Maegawa | ............. | H02J 7/0018 320/128 |
| 8,207,740 | B2 | * | 6/2012 | Lin | ................... | H01M 10/4207 324/427 |
| 8,498,830 | B2 | * | 7/2013 | Landry | ................ | G01R 31/385 702/63 |

(Continued)

FOREIGN PATENT DOCUMENTS

JP 2014-093855 A 5/2014
JP 2016-220504 A 12/2016
(Continued)

*Primary Examiner* — John T Trischler
(74) *Attorney, Agent, or Firm* — Oliff PLC

(57) ABSTRACT

A battery control device that controls a battery assembly includes a first determining unit that determines whether a voltage difference between minimum and maximum values of OCVs of battery cells constituting the battery assembly and having an SOC-OCV characteristic curve including a flat region is equal to or larger than a predetermined voltage value, a second determining unit that determines whether the OCV of each battery cell is lower than a lower-limit voltage of the flat region, or is equal to or higher than the lower-limit voltage and lower than an upper-limit voltage, or is higher than the upper-limit voltage, a controller that executes control selected from SOC raising control, SOC lowering control, and SOC keeping control of the battery cells, based on determination results of the first and second determining units, and a processor that homogenizes the SOCs of the battery cells controlled by the controller.

5 Claims, 10 Drawing Sheets

(56) References Cited

U.S. PATENT DOCUMENTS

| | | | |
|---|---|---|---|
| 9,006,920 B2* | 4/2015 | Favaretto | B60L 58/12 307/9.1 |
| 9,118,191 B2* | 8/2015 | Jung | H02J 7/0086 |
| 9,165,736 B2* | 10/2015 | Nakamoto | G01R 31/3842 |
| 9,190,855 B2* | 11/2015 | White | H02J 7/0026 |
| 9,385,545 B2* | 7/2016 | Nakamoto | H02J 7/0031 |
| 9,463,699 B2* | 10/2016 | Nakamoto | G01R 31/005 |
| 9,482,722 B2* | 11/2016 | Hayashi | H01M 10/48 |
| 9,490,646 B2* | 11/2016 | Kubota | H01M 10/4207 |
| 9,525,290 B2* | 12/2016 | Snyder | H02J 7/0016 |
| 9,525,301 B2* | 12/2016 | White | H02J 7/0026 |
| 9,643,508 B2* | 5/2017 | Boehm | H01M 10/4257 |
| 9,649,950 B2* | 5/2017 | Katayama | H01M 10/4207 |
| 9,701,207 B2* | 7/2017 | Nakamoto | H02J 7/0022 |
| 9,718,375 B2* | 8/2017 | Le | B60L 1/003 |
| 9,728,820 B2* | 8/2017 | Diamond | B60L 58/22 |
| 9,759,779 B2* | 9/2017 | Hayashi | G01R 31/3842 |
| 9,948,228 B2* | 4/2018 | Usuda | H02J 7/0024 |
| 9,985,448 B2* | 5/2018 | Nakamoto | B60L 58/15 |
| 10,027,134 B2* | 7/2018 | Mei | H02J 7/0047 |
| 10,291,038 B2* | 5/2019 | Mei | H01M 10/441 |
| 10,336,196 B2* | 7/2019 | Nakamoto | H01M 10/486 |
| 10,381,845 B2* | 8/2019 | Nakamoto | H02J 7/0077 |
| 10,476,280 B2* | 11/2019 | Fukushima | H01M 50/20 |
| 10,547,089 B2* | 1/2020 | Zhang | H01M 10/425 |
| 10,661,667 B2* | 5/2020 | Nakamoto | H02J 7/0026 |
| 10,739,409 B2* | 8/2020 | Shiraishi | G01R 31/3828 |
| 10,814,742 B2* | 10/2020 | Anderson | G01R 31/3842 |
| 10,916,813 B2* | 2/2021 | Cha | H01M 10/42 |
| 2003/0160593 A1* | 8/2003 | Yau | H02J 7/0018 320/116 |
| 2005/0083016 A1* | 4/2005 | Yau | H02J 7/0018 320/116 |
| 2009/0066291 A1* | 3/2009 | Tien | H02J 7/0069 320/118 |
| 2009/0315519 A1* | 12/2009 | Izumi | H02J 7/0021 320/134 |
| 2010/0237828 A1* | 9/2010 | Maegawa | H02J 7/0016 320/118 |
| 2010/0320969 A1* | 12/2010 | Sakakibara | H01M 10/425 320/118 |
| 2010/0321025 A1* | 12/2010 | Lin | H01M 10/4207 324/427 |
| 2011/0248675 A1* | 10/2011 | Shiu | H01M 10/44 320/118 |
| 2012/0001480 A1* | 1/2012 | Favaretto | H02J 7/342 307/9.1 |
| 2012/0053870 A1* | 3/2012 | Landry | G01R 31/385 702/63 |
| 2012/0262126 A1* | 10/2012 | Boehm | B60L 58/15 320/162 |
| 2012/0319658 A1* | 12/2012 | White | H02J 7/0021 320/134 |
| 2013/0049698 A1* | 2/2013 | Jung | H02J 7/0086 320/134 |
| 2013/0119898 A1* | 5/2013 | Ohkura | H01M 10/441 318/139 |
| 2013/0138370 A1* | 5/2013 | Oh | G01R 31/3842 702/63 |
| 2013/0234672 A1* | 9/2013 | Kubota | H02J 7/007 320/134 |
| 2013/0257323 A1* | 10/2013 | Diamond | H01M 10/441 318/376 |
| 2013/0257381 A1* | 10/2013 | Diamond | B60L 58/20 320/134 |
| 2014/0104739 A1* | 4/2014 | Nakamoto | H02J 7/0021 361/160 |
| 2014/0117756 A1* | 5/2014 | Takahashi | H02J 7/35 307/23 |
| 2014/0125259 A1* | 5/2014 | Knight | G01R 31/3842 318/139 |
| 2014/0125344 A1* | 5/2014 | Knight | G01R 31/367 324/426 |
| 2014/0184236 A1* | 7/2014 | Ohkawa | G01R 31/3835 324/433 |
| 2014/0232410 A1* | 8/2014 | Hayashi | B60L 58/12 324/426 |
| 2014/0320070 A1* | 10/2014 | Nakamoto | H02J 7/0068 320/107 |
| 2015/0115736 A1* | 4/2015 | Snyder | H02J 7/0016 307/115 |
| 2015/0336459 A1* | 11/2015 | Nakamoto | H02J 7/0016 307/10.1 |
| 2016/0009194 A1* | 1/2016 | Katayama | B60L 58/15 320/109 |
| 2016/0064965 A1* | 3/2016 | White | H02J 7/0016 320/134 |
| 2016/0190829 A1* | 6/2016 | Mei | H02J 7/0016 320/112 |
| 2016/0233696 A1* | 8/2016 | Mei | H02J 7/0047 |
| 2016/0285291 A1* | 9/2016 | Nakamoto | H02J 7/0031 |
| 2016/0299193 A1* | 10/2016 | Hayashi | G01R 31/3828 |
| 2017/0001525 A1* | 1/2017 | Nakamoto | H01M 10/486 |
| 2017/0093320 A1* | 3/2017 | Usuda | H02P 27/08 |
| 2017/0110892 A1* | 4/2017 | Cao | H02J 7/0077 |
| 2017/0120773 A1* | 5/2017 | Zhang | B60L 58/22 |
| 2017/0253128 A1* | 9/2017 | Nakamoto | H01M 4/587 |
| 2017/0264136 A1* | 9/2017 | Schindler | B60L 3/0046 |
| 2017/0282745 A1* | 10/2017 | Kawamura | B60L 58/13 |
| 2017/0288425 A1* | 10/2017 | Fukushima | H02J 7/0021 |
| 2018/0041052 A1* | 2/2018 | Nakamoto | H02J 7/0016 |
| 2018/0041054 A1* | 2/2018 | Nakamoto | H02J 7/00308 |
| 2018/0093581 A1* | 4/2018 | Shiraishi | B60L 11/1864 |
| 2018/0205342 A1* | 7/2018 | Usuda | H02P 6/14 |
| 2018/0259585 A1* | 9/2018 | Shiraishi | B60R 16/03 |
| 2019/0123394 A1* | 4/2019 | Cha | H01M 10/48 |
| 2019/0176638 A1* | 6/2019 | Anderson | G01R 31/3647 |
| 2019/0184846 A1* | 6/2019 | Kang | B60L 58/12 |
| 2019/0260092 A1* | 8/2019 | Akaishi | G01R 31/36 |
| 2019/0283614 A1* | 9/2019 | Nakamoto | H02J 7/0021 |
| 2019/0288520 A1* | 9/2019 | Abdel-Monem | G01R 31/392 |
| 2020/0047634 A1* | 2/2020 | Akaishi | B60L 58/20 |
| 2020/0153255 A1* | 5/2020 | Inoue | H02J 7/0048 |
| 2020/0153263 A1* | 5/2020 | Akaishi | H02J 7/1446 |
| 2020/0220230 A1* | 7/2020 | Akaishi | H02J 7/007 |
| 2020/0223422 A1* | 7/2020 | Ye | B60W 20/13 |
| 2020/0341068 A1* | 10/2020 | Takahashi | G01R 31/392 |
| 2020/0355748 A1* | 11/2020 | Akaishi | G01R 31/367 |
| 2020/0384888 A1* | 12/2020 | Hasan | B60L 58/15 |

FOREIGN PATENT DOCUMENTS

| | | | |
|---|---|---|---|
| JP | 6188841 B2 * | 8/2017 | H02J 7/0021 |
| JP | 2017-162721 A | 9/2017 | |
| JP | 2018125977 A * | 8/2018 | |
| WO | WO-2012132914 A1 * | 10/2012 | H01M 10/441 |

* cited by examiner

BATTERY CONTROL DEVICE FOR HOMOGENIZING BATTERY CELLS

INCORPORATION BY REFERENCE

The disclosure of Japanese Patent Application No. 2018-202098 filed on Oct. 26, 2018 including the specification, drawings and abstract is incorporated herein by reference in its entirety.

BACKGROUND

1. Technical Field

The disclosure relates to a battery control device that controls a battery assembly that consists of a plurality of battery cells.

2. Description of Related Art

In a battery assembly having a plurality of battery cells connected in series, the states of charge of the respective battery cells may become non-uniform, due to variations at the time of manufacture of the battery cells or variations in chronological deterioration. The non-uniformity in the states of charge of the battery cells may accelerate deterioration of a part of the battery cells, and cause a reduction of the efficiency of the battery assembly as a whole. As a countermeasure against this situation, a process for homogenizing the states of charge of a plurality of battery cells that constitutes a battery assembly is disclosed in Japanese Unexamined Patent Application Publication No. 2014-093855 (JP 2014-093855 A).

SUMMARY

When batteries having SOC-OCV characteristics with which the power storage amount (SOC) can be uniquely specified from the open circuit voltage (OCV) are used as the battery cells of the battery assembly, it can be determined whether a process (battery homogenization process) for homogenizing the states of charge of a plurality of battery cells needs to be performed, by detecting the open circuit voltage of each battery cell.

However, in a battery, such as a lithium iron phosphate battery (LFP battery), of which the SOC-OCV characteristics have a flat region (see FIG. 2), it is difficult to uniquely specify the power storage amount from the open circuit voltage in the flat region. Therefore, in a battery assembly using the LFP batteries as its battery cells, the homogenization process cannot be efficiently performed on the batteries of which the open circuit voltages are in the flat region, which may cause a reduction of chances of executing the battery homogenization process. As the chances of executing the battery homogenization process decrease, variations in the states of charge of the respective battery cells may be expanded, and the performance of the battery assembly may deteriorate.

This disclosure provides a battery control device that increases chances of efficiently executing a battery homogenization process, and is thus able to prevent deterioration of the performance of a battery assembly, by making the states of charge of the respective battery cells uniform with high accuracy.

One aspect of the disclosure is concerned with a battery control device that controls a battery assembly provided by connecting a plurality of battery cells having an SOC-OCV characteristic curve including a flat region in which a rate of change of an open circuit voltage with respect to a power storage amount is smaller than that in an adjacent region. The battery control device includes: a first determining unit configured to determine whether a voltage difference between a minimum value and a maximum value of open circuit voltages of the battery cells is equal to or larger than a predetermined voltage value, a second determining unit configured to determine whether the open circuit voltage of each of the battery cells is lower than a lower-limit voltage of the flat region, or is equal to or higher than the lower-limit voltage and lower than an upper-limit voltage of the flat region, or is higher than the upper-limit voltage, a controller configured to execute one control selected from control for raising power storage amounts of the battery cells, control for lowering the power storage amounts of the battery cells, and control for keeping the power storage amounts of the battery cells, based on results of determinations made by the first determining unit and the second determining unit, and a processor configured to perform a process of homogenizing the power storage amounts of the battery cells controlled by the controller.

The battery control device of the disclosure can increase chances of efficiently executing the battery homogenization process, and can prevent deterioration of the performance of the battery assembly by making the states of charge of the respective battery cells uniform with high accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

When operating states of a plurality of battery cells that constitutes a battery assembly are within or in the vicinity of a flat region in which a battery homogenization process cannot be efficiently performed, a battery control device of the disclosure increases or reduces the power storage amounts of the battery cells (i.e., the amounts of electric power stored in the battery cells) at the same time, and make the battery cells get out of the flat region. In this manner, chances of efficiently performing the battery homogenization process can be increased, and the states of charge of the respective battery cells are homogenized with high accuracy, so that the performance of the battery assembly can be prevented from deteriorating.

In the following embodiment, the battery control device of the disclosure is applied to a battery for automatic driving backup installed on a vehicle having an automatic driving system, as one type of batteries of which the power storage states need be managed with high accuracy through execution of the battery homogenization process.

Figure 1:
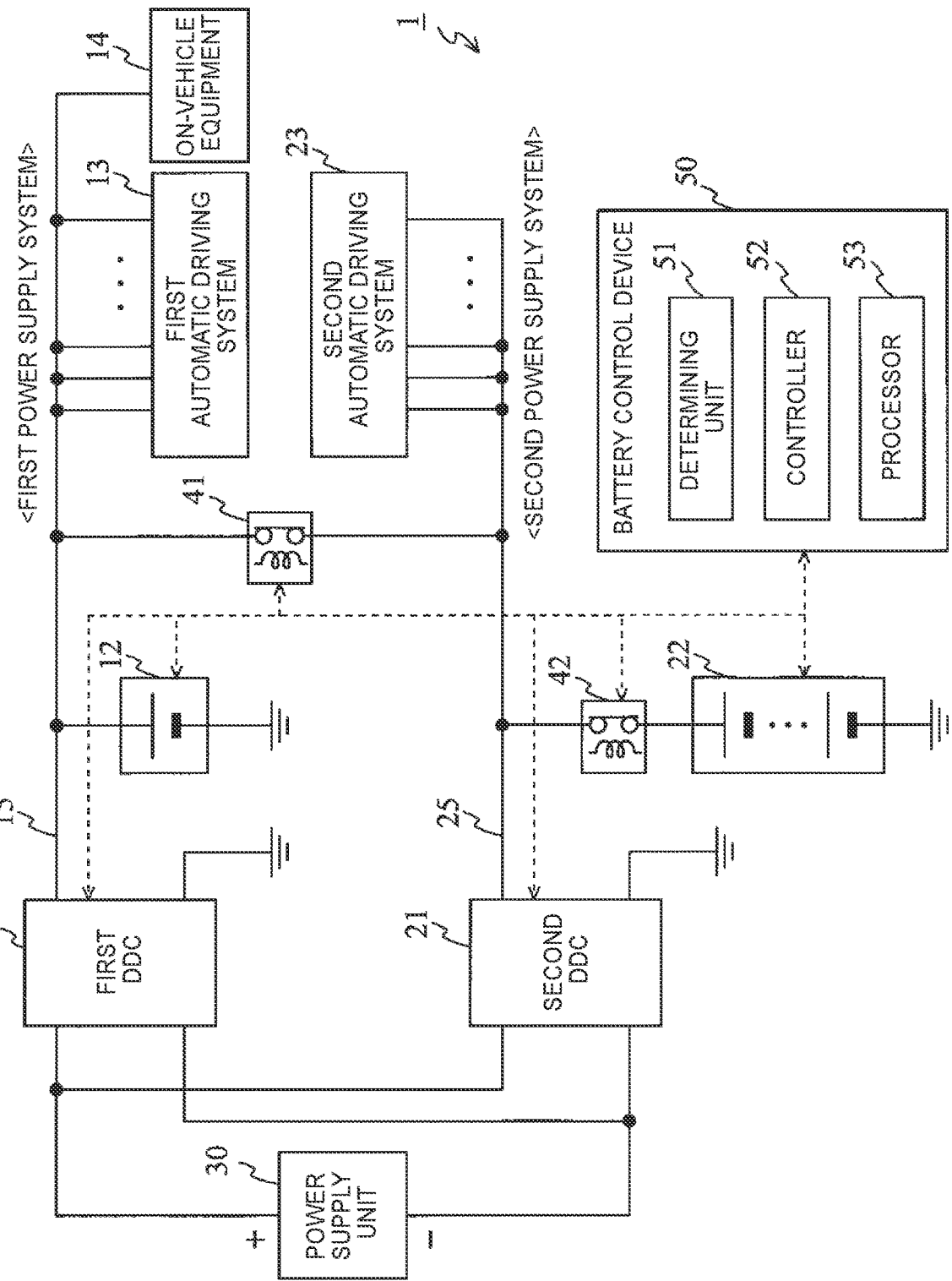
FIG. 1 is a view showing an example of the general configuration of a redundant power supply system for a vehicle including a battery control device according to one embodiment.

FIG. 1 shows an example of the general configuration of a redundant power supply system 1 for a vehicle including a battery control device 50 according to this embodiment. The redundant power supply system 1 shown in FIG. 1 has a first power supply system including a first DC-DC converter (which will be denoted as "first DDC") 11, first battery 12, first automatic driving system 13, and on-vehicle equipment 14, a second power supply system including a second DC-DC converter (which will be denoted as "second DDC") 21, second battery 22, and second automatic driving system 23, a power supply unit 30, a first relay device 41, a second relay device 42, and the battery control device 50. The first battery 12, first automatic driving system 13, and on-vehicle equipment 14 of the first power supply system are connected to the output side of the first DDC 11, via a first power supply line 15. The second battery 22 and second automatic driving system 23 of the second power supply system are connected to the output side of the second DDC 21, via a second power supply line 25.

The redundant power supply system 1 employs a redundant power supply arrangement that consists of the first power supply system and the second power supply system. The first power supply system and the second power supply system are connected via a first relay device 41 for supply of dark current. The second battery 22 is connected to the second power supply system via a second relay device 42 for battery protection. The first relay device 41 and the second relay device 42 are controlled by the battery control device 50 so as to be connected or disconnected.

The power supply unit 30 can supply electric power to the first DDC 11 and the second DDC 21 in parallel. A rechargeable and dischargeable high-voltage battery, such as a lithium-ion battery, is used as the power supply unit 30.

The first DDC 11 converts electric power supplied from the power supply unit 30, and delivers the power to the first battery 12, first automatic driving system 13, and on-vehicle equipment 14, via the first power supply line 15.

The first battery 12 is a rechargeable/dischargeable secondary battery, such as a lead acid battery. The first battery 12 can store (can be charged with) electric power delivered from the first DDC 11, and delivers (discharges) the power stored therein, to the first automatic driving system 13 and the on-vehicle equipment 14. Further, the first battery 12 can store (can be charged with) electric power discharged from the second battery 22, via the first relay device 41 and the second relay device 42.

The first automatic driving system 13 includes on-vehicle equipment required for automatically driving the vehicle. The on-vehicle equipment required for automatic driving includes an automatic driving electronic control unit (ECU), electric brake system (EBS), electric power steering system (EPS), and so forth, for example.

The on-vehicle equipment 14 includes one or more on-vehicle devices that are not concerned with automatic driving of the vehicle. The on-vehicle equipment 14 includes devices, such as headlamps and wipers, for example.

The second DDC 21 converts electric power supplied from the power supply unit 30, and delivers the power to the second battery 22 and the second automatic driving system 23, via the second power supply line 25.

Figure 2:
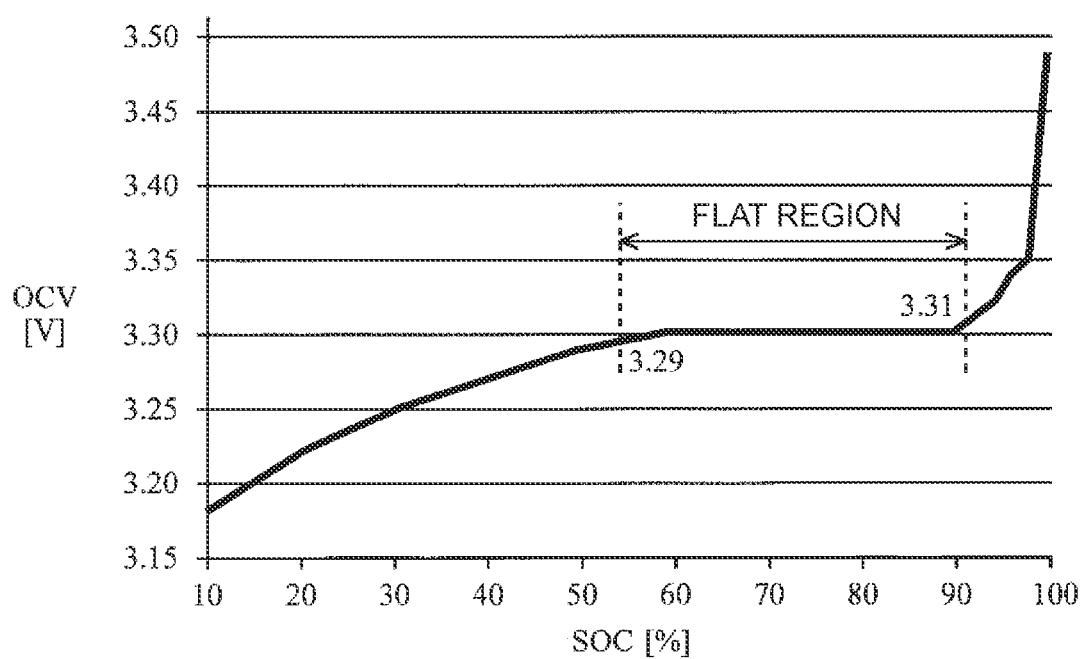
FIG. 2 is a view showing one example of SOC-OCV characteristics of a lithium-ion battery.

The second battery 22 is a battery assembly that consists of at least two or more rechargeable/dischargeable secondary batteries, such as lithium-ion batteries, which are connected in series. As one example, a lithium iron phosphate battery (or LFP (lithium ferrophosphate) battery) may be used as a battery cell of the second battery 22. The lithium iron phosphate battery has an SOC-OCV characteristic curve having a flat region in which the rate of change of the open circuit voltage (OCV) with respect to the power storage amount (SOC) is smaller than those of adjacent regions, as shown in FIG. 2. The second battery 22 can store (can be charged with) electric power delivered from the second DDC 21, via the second relay device 42, and can deliver (discharge) the power stored therein, to the second automatic driving system 23, etc. The second battery 22 is used for supplying electric power to the second automatic driving system 23, and is also used as a battery for backup, which serves as a spare battery that supports functions concerning automatic driving of the vehicle when a defect arises in the first battery 12 during automatic driving of the vehicle.

The second automatic driving system 23 is provided redundantly, as a system that is the same as the first automatic driving system 13, and includes on-vehicle equipment required to automatically drive the vehicle, like the first automatic driving system 13.

The first relay device 41 is provided between the first power supply line 15 and the second power supply line 25, and is arranged to be able to connect and disconnect the first power supply line 15 and the second power supply line 25 to and from each other, under control of the battery control device 50. The first relay device 41 is placed in a connecting state when the vehicle power supply is turned off, such as during parking, so as to form a path through which dark current is supplied from the first battery 12 to the second automatic driving system 23. Also, the first relay device 41 can be placed in the connecting state when SOC lowering control that will be described later is performed, and forms a path through which electric power of the second battery 22 is transferred to the first battery 12 when it is in the connecting state. The first relay device 41 is placed in a disconnecting state, in cases other than the above cases, so as to electrically separate the first power supply system and the second power supply system from each other.

The second relay device 42 is provided between the second power supply line 25 and the second battery 22, and is arranged to be able to connect and disconnect the second power supply line 25 and the second battery 22 to and from each other, under control of the battery control device 50. The second relay device 42 is placed in a disconnecting state when the vehicle power supply is in the OFF state, such as during parking, except for the time when the battery homogenization process as described later is intermittently performed, so as to prevent current consumption from the second battery 22 to the second automatic driving system 23. The second relay device 42 is placed in a connecting state in cases other than the above case, and supplies electric power to the second automatic driving system 23.

The battery control device 50 manages conditions and operation of the first DDC 11, second DDC 21, first battery 12, second battery 22, first relay device 41, and second relay device 42, so as to control conditions of the redundant power supply system 1. The battery control device 50 of this embodiment performs control for estimating the power storage state of the second battery 22 with high accuracy.

The battery control device 50 may be typically configured as an electronic control unit (ECU) including a central processing unit (CPU), memory, input-output interface, and so forth. The battery control device 50 may include a part or all of ECUs installed on the vehicle, including a monitoring ECU that monitors the voltage, current, and temperature of the second battery 22, and a power supply ECU that can control the output voltage of the second DDC 21, and control the connecting/disconnecting state of the first relay device 41, for example. The battery control device 50 of this embodiment implements the functions of a determining unit 51, a controller 52, and a processor 53, by causing the CPU to read and execute programs stored in the memory.

The determining unit 51 obtains the open circuit voltage of each of the battery cells that constitute the second battery 22. Then, the determining unit 51 determines whether there are variations in the open circuit voltages of the battery cells. The presence or absence of variations is determined depending on whether a voltage difference between the minimum value and maximum value of the open circuit voltages of the respective battery cells is equal to or larger than a predetermined voltage value (first determination). The open circuit voltage of each battery cell can be obtained with a voltage sensor provided in the batter cell. The determining unit 51 also determines whether the open circuit voltage of each battery cell is lower than a lower-limit voltage of the flat region of the SOC-OCV characteristic curve as described above, or is equal to or higher than the lower-limit voltage and lower than an upper-limit voltage of the flat region, or is equal to or higher than the upper-limit voltage (second determination). The lower-limit voltage and upper-limit voltage of the flat region may be set based on whether the power storage amount can be uniquely specified from the open circuit voltage on the SOC-OCV characteristic curve of the battery cell, in view of measurement errors of the voltage sensor. For example, in the case of the SOC-OCV characteristic curve shown in FIG. 2, the lower-limit voltage is 3.29 V, and the upper-limit voltage is 3.31 V.

The controller 52 performs, based on the results of the first determination and the second determination made by the determining unit 51, any one of control (which will be called "SOC raising control") for raising the power storage amounts of the battery cells, control (which will be called "SOC lowering control") for reducing the power storage amounts of the battery cells, and control (which will be called "SOC keeping control") for keeping the power storage amounts of the battery cells. Typically, the controller 52 obtains the results of the first determination and the second determination made by the determining unit 51 at the time when the vehicle is brought into an "ignition-on (IG-ON)" state, and determines control to be executed, based on the results of the determinations.

The SOC raising of the battery cells means control for raising the power storage amounts of all of the battery cells at the same time by passing charge current through the second battery 22, for example. Since operation using the second DDC 21 is needed for passing charge current through the second battery 22, the SOC raising is carried out during a period in which the vehicle is in a "READY-ON" state in which the second DDC 21 is in operation. The SOC raising is finished when the open circuit voltage of any one of the battery cells reaches a predetermined upper-limit value, or when the open circuit voltages of all of the battery cells become equal to or higher than the upper-limit voltage of the flat region. The upper-limit value is a threshold value set so as to prevent the power storage amount of the battery cell from being increased more than necessary, and may be set based on a voltage that results in overcharging, for example. Also, the SOC lowering of the battery cells means control for reducing the power storage amounts of all of the battery cells at the same time by causing current to flow from the second battery 22, for example. The SOC lowering is carried out during a period in which the vehicle is in an IG-OFF (ignition off) state, because it is undesirable to reduce the power storage amount of the second battery 22 as a backup battery for automatic driving, during vehicle traveling. The SOC lowering is finished when the open circuit voltage of any one of the battery cells reaches a predetermined lower-limit value, or when the open circuit voltages of all of the battery cells become equal to or lower than the lower-limit voltage of the flat region. The lower-limit value is a threshold value set so as to prevent the power storage amount of the battery cell from being reduced more than necessary, and may be set based on a voltage that results in over discharge, for example. Also, the control for keeping the power storage amounts of the battery cells is control for keeping the power storage amounts of all of the battery cells as they are, without passing any current through the second battery 22, for example.

Also, the controller 52 can predict a situation where variations are likely to appear in the power storage amounts of the battery cells that constitute the second battery 22. This prediction can be made based on spontaneous discharging of the second battery 22 which occurs while the vehicle is not in use, such as during parking, and charging of the second battery 22 conducted while the vehicle is in use, such as during traveling. Even when the first determination of the determining unit 51 reveals that there are no variations in the open circuit voltages of the battery cells, the controller 52 determines execution of the SOC raising control, at a point in time when variations are expected to appear in the power storage amounts of the battery cells. This point in time can be determined depending upon whether the number of trips has reached a predetermined count value, using a trip counter that increments the number of trips by one when the vehicle is brought into an ignition-on (IG-ON) state. Whether the number of trips has reached the predetermined count value may be determined using a trip lapse flag, for example.

The processor 53 performs a battery homogenization process for eliminating variations in the battery cells that constitute the second battery 22. The battery homogenization process is a process for making the power storage amounts of the battery cells equal or within a predetermined range. In the battery homogenization process of this embodiment, the open circuit voltage of each battery cell is controlled to be equal to the minimum open circuit voltage (which will be called "minimum OCV"). The battery homogenization process is carried out during a period in which the vehicle is in the IG-OFF state, because discharge is used for controlling the open circuit voltage of each battery cell to the minimum OCV. Also, the battery homogenization process is intermittently performed, so as to reduce electric power consumed by the processor 53 during the IG-OFF period.

Detailed control of the determining unit 51, controller 52, and processor 53 will be described below.

Figure 3A:
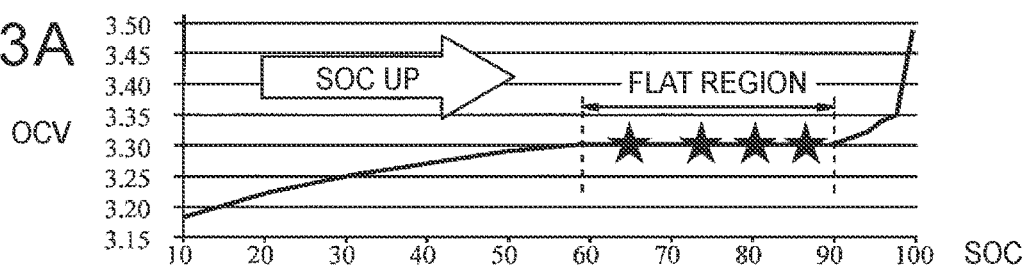
FIG. 3A is a view showing one example of the relationship between the states of respective battery cells and control executed by a controller when a second battery consists of four battery cells.
Figure 3B:
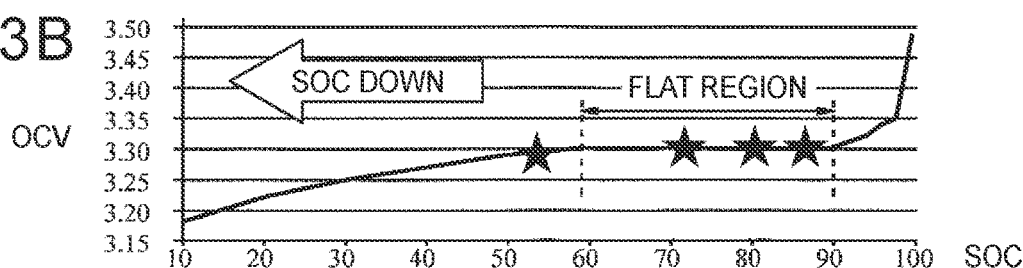
FIG. 3B is a view showing one example of the relationship between the states of respective battery cells and control executed by the controller when the second battery consists of four battery cells.
Figure 3C:
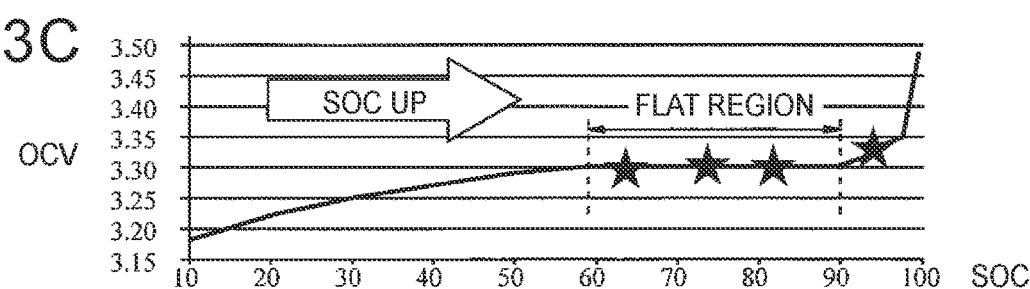
FIG. 3C is a view showing one example of the relationship between the states of respective battery cells and control executed by the controller when the second battery consists of four battery cells.
Figure 3D:
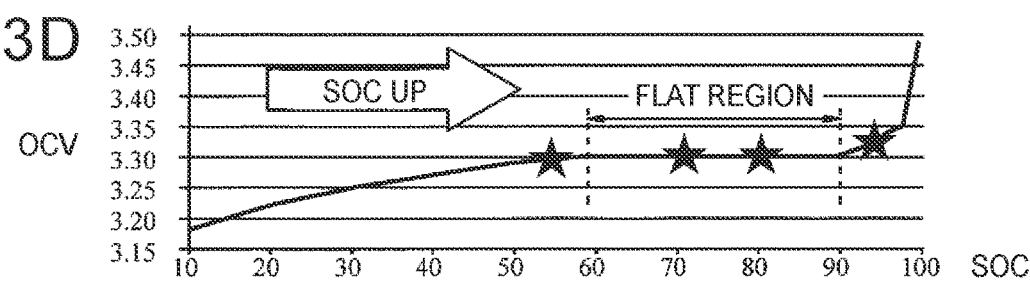
FIG. 3D is a view showing one example of the relationship between the states of respective battery cells and control executed by the controller when the second battery consists of four battery cells.
Figure 3E:
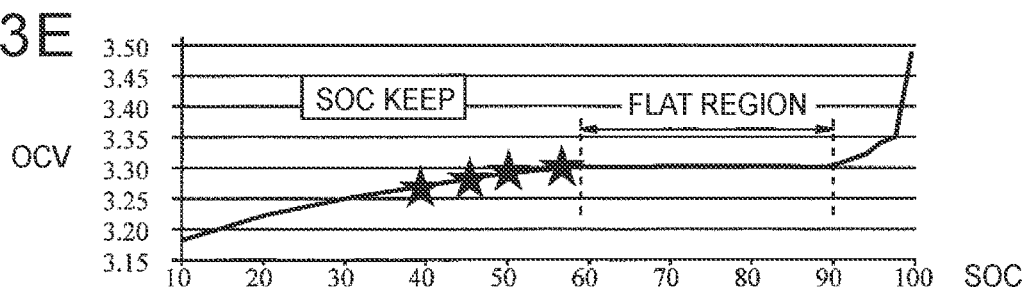
FIG. 3E is a view showing one example of the relationship between the states of respective battery cells and control executed by the controller when the second battery consists of four battery cells.
Figure 3F:
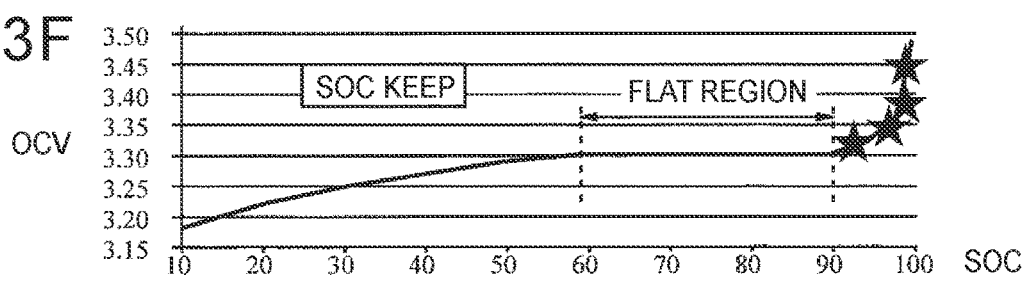
FIG. 3F is a view showing one example of the relationship between the states of respective battery cells and control executed by the controller when the second battery consists of four battery cells.
Figure 4:
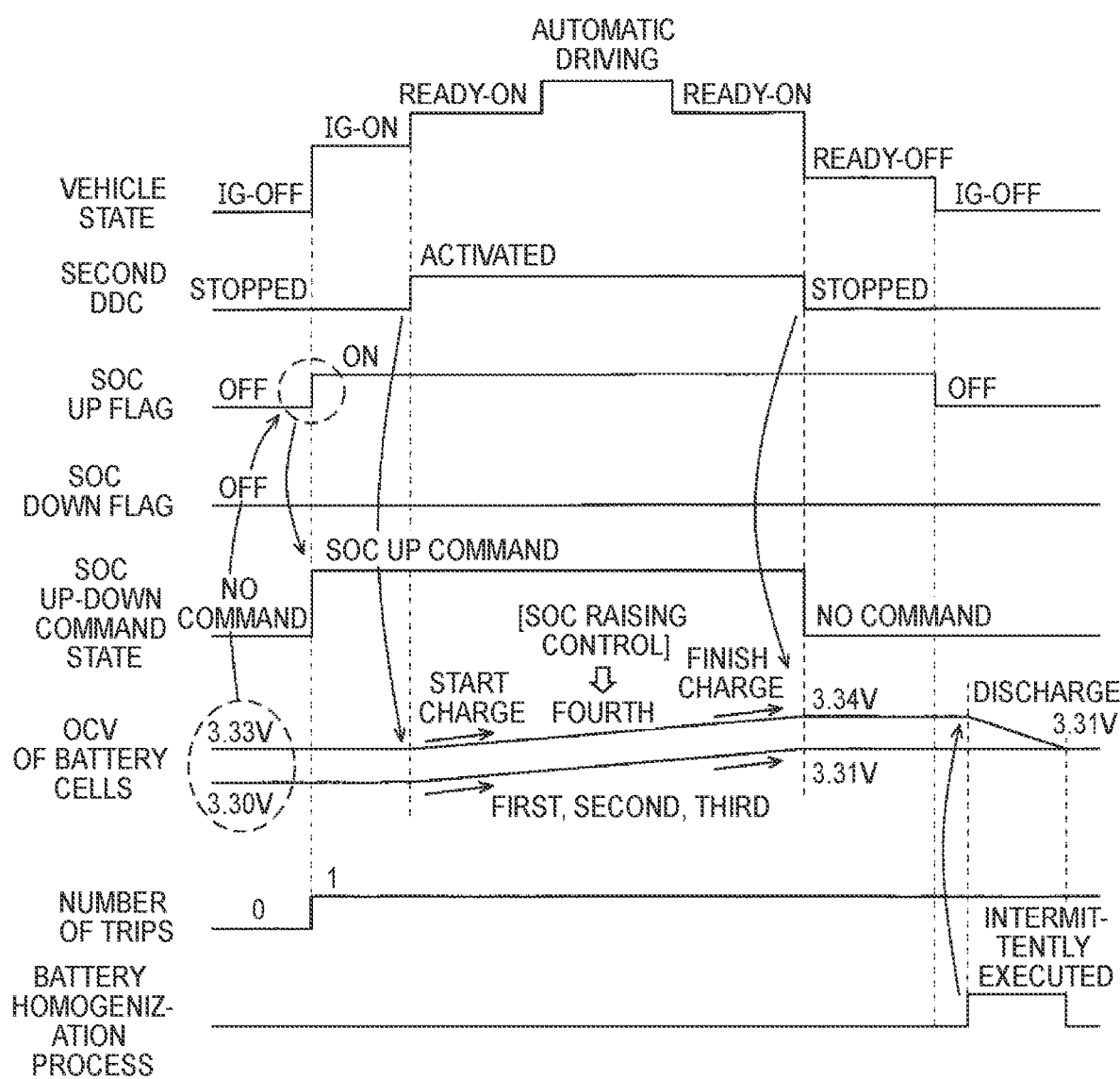
FIG. 4 is a timing chart showing one example of SOC raising control.
Figure 5:
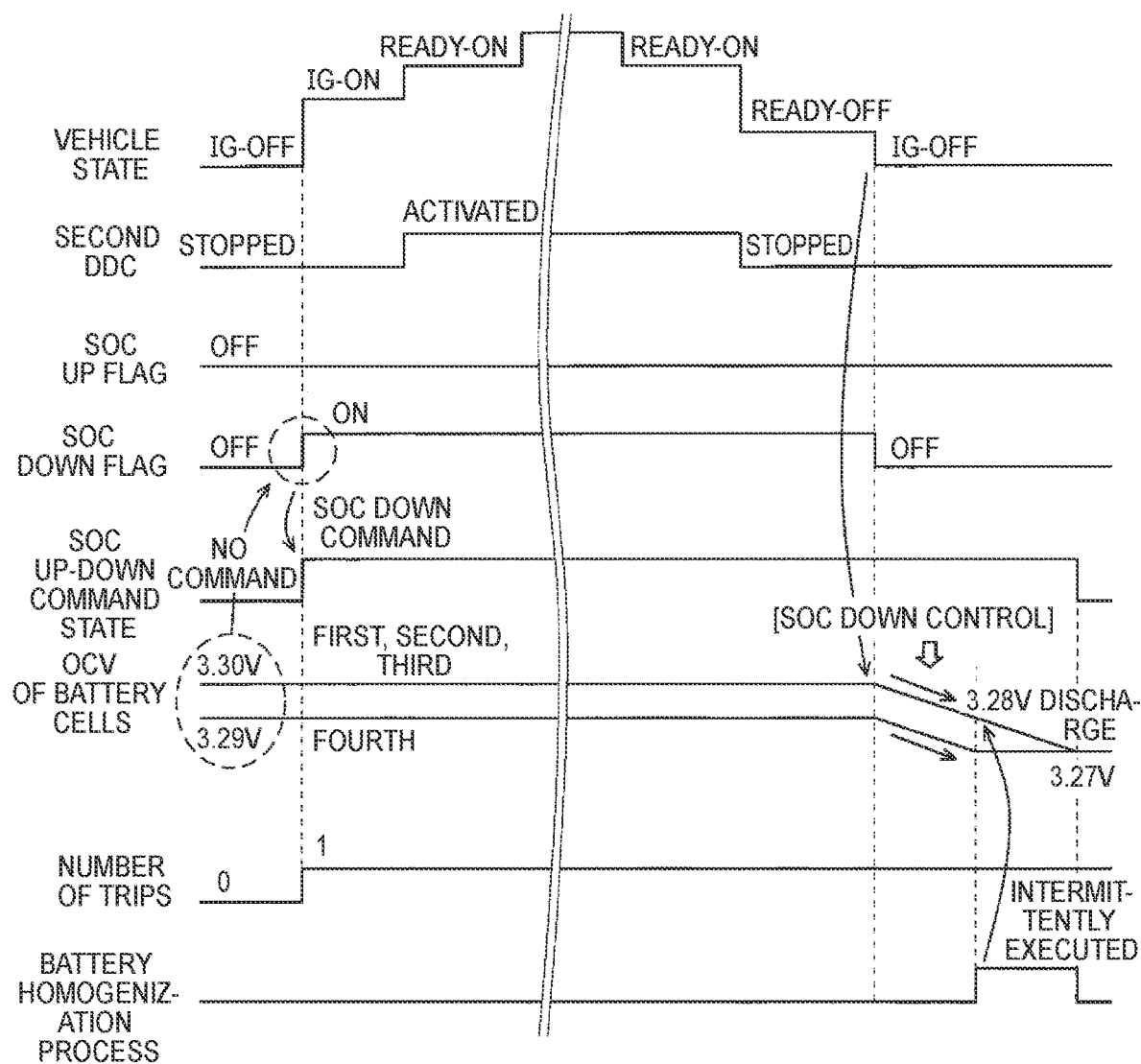
FIG. 5 is a timing chart showing one example of SOC lowering control.
Figure 6:
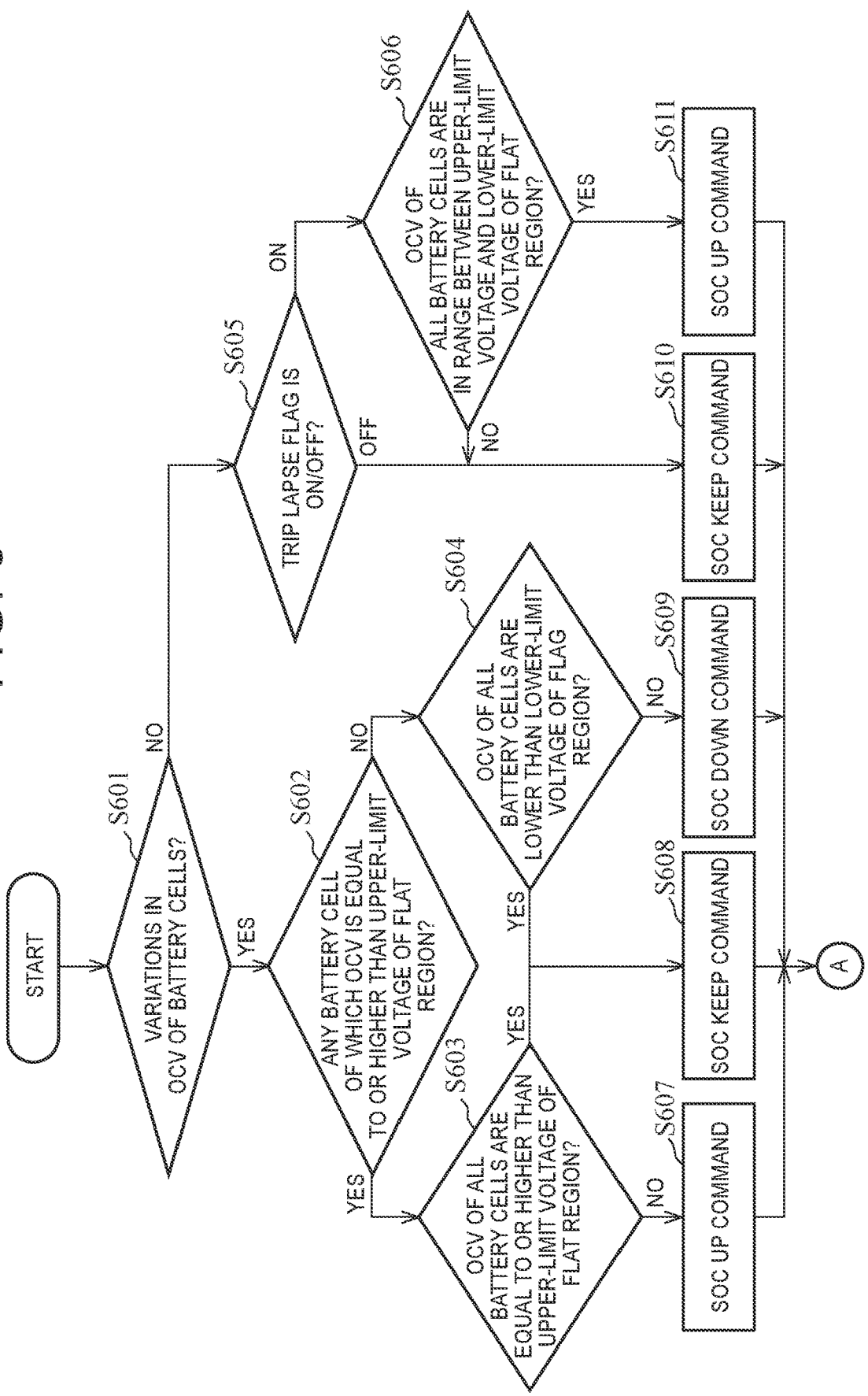
FIG. 6 is a flowchart illustrating a process of determining control executed by a controller.
Figure 7:
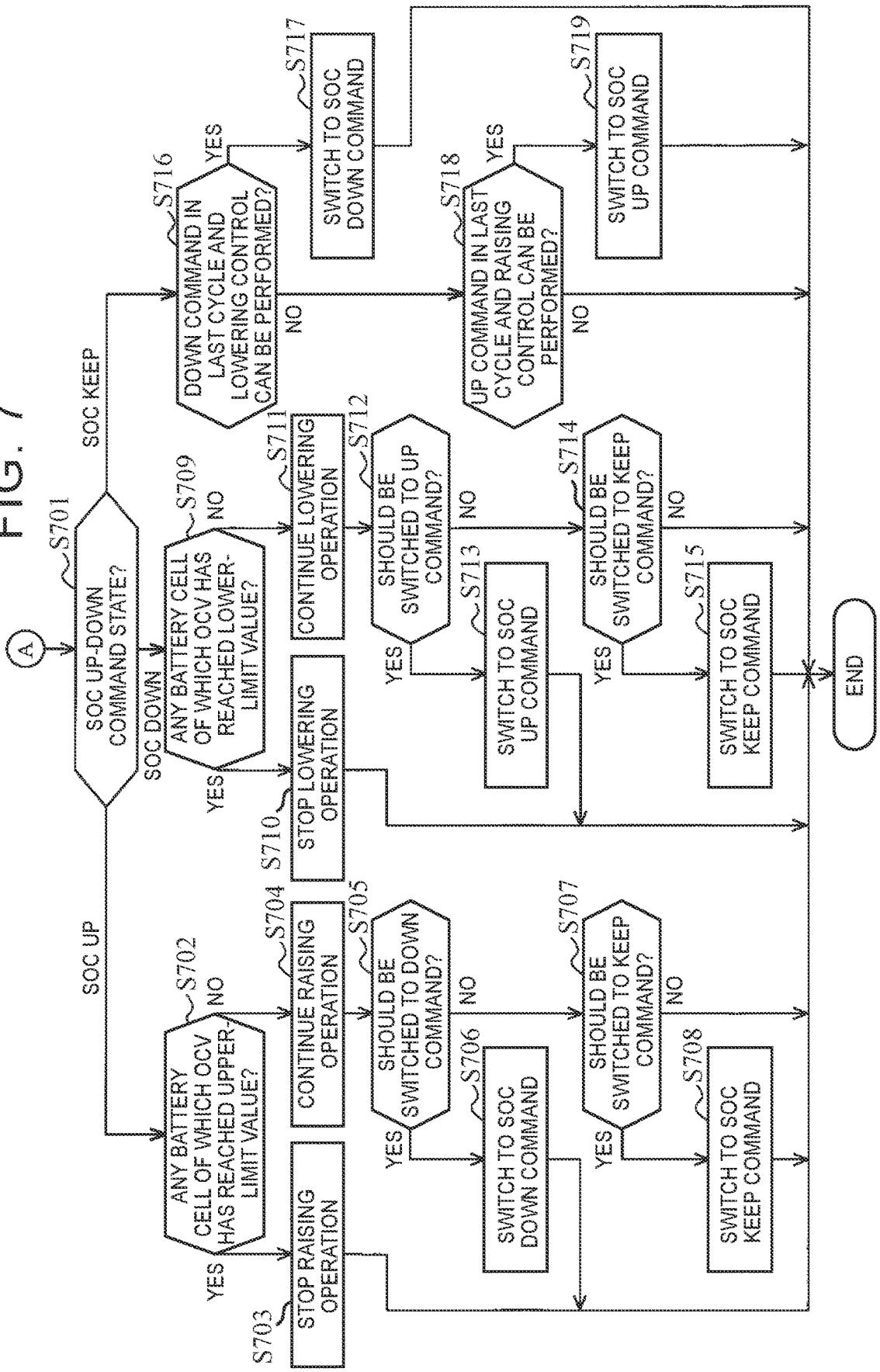
FIG. 7 is a flowchart illustrating the process of determining control executed by the controller.
Figure 8:
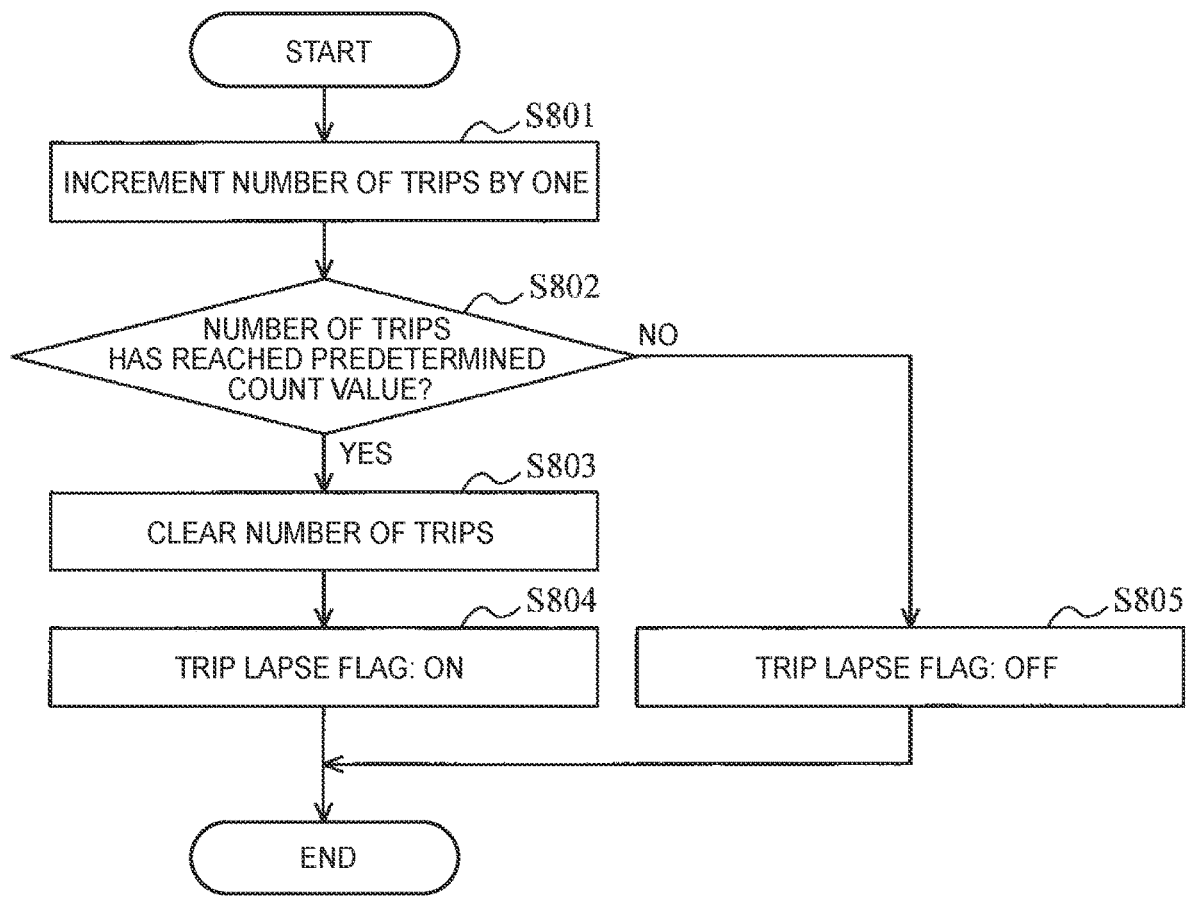
FIG. 8 is a flowchart illustrating a process of managing the number of trips.
Figure 9:
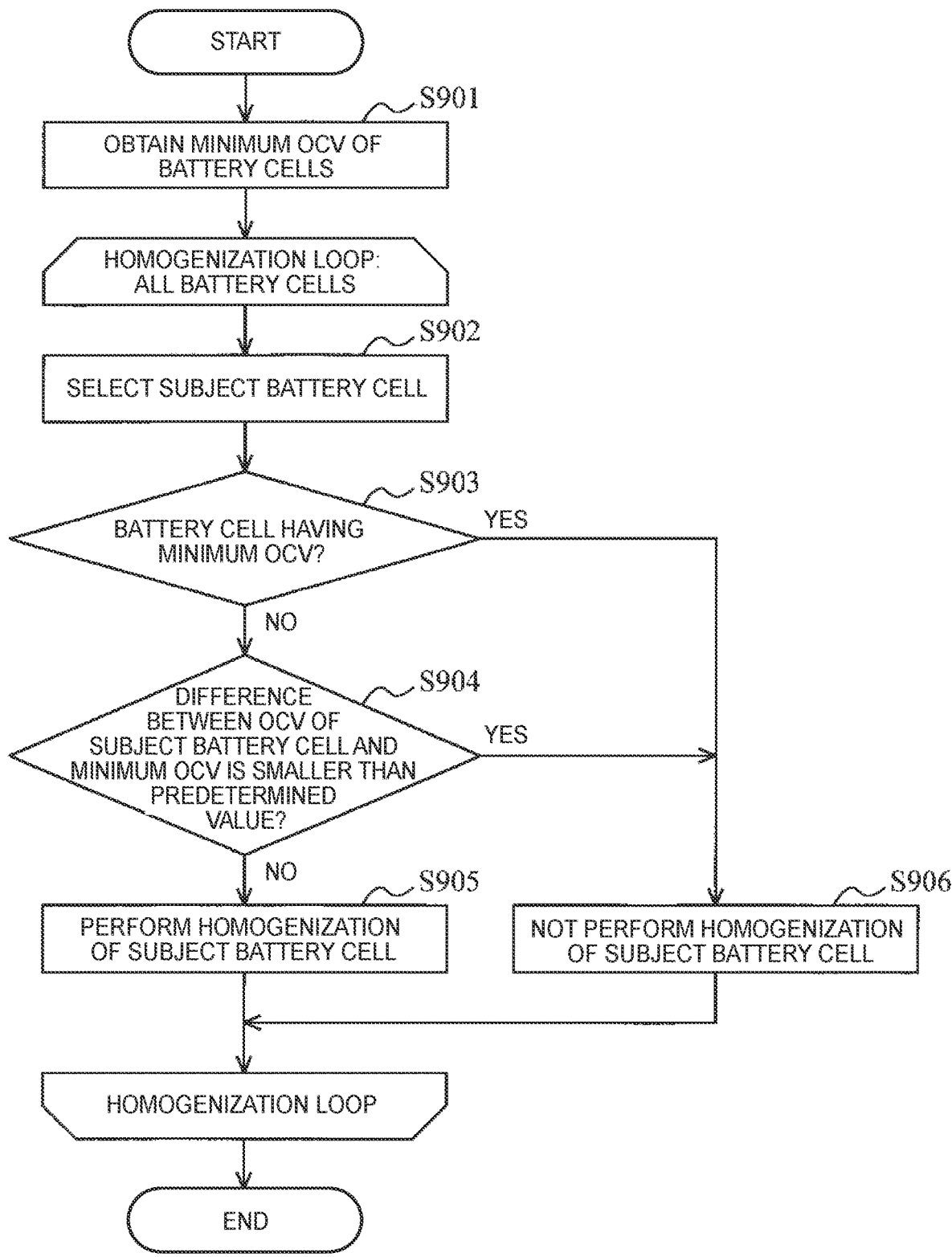
FIG. 9 is a flowchart illustrating a battery homogenization process executed by a processor.

Referring next to FIG. 3A to FIG. 9, control performed by the battery control device 50 according to this embodiment will be described. FIG. 3A to FIG. 3F show one example of the relationships between the states of respective battery cells and control performed by the controller 52, in the case where the second battery 22 consists of four battery cells. FIG. 4 is one example of a timing chart of the SOC raising control. FIG. 5 is one example of a timing chart of the SOC lowering control. FIG. 6 and FIG. 7 are flowcharts illustrating a process of determining control performed by the controller 52. FIG. 8 is a flowchart illustrating a process of managing the number of trips. FIG. 9 is a flowchart illustrating the battery homogenization process performed by the processor 53.

(1) Power Storage Amount Control of Battery Cells

Referring to FIG. 6, a process for determining which control, out of the SOC raising control, SOC lowering control, and SOC keeping control, is applied or used as control of the power storage amounts of the battery cells will be described. The process shown in FIG. 6 is started when the vehicle is brought into a "READY-ON" state in which the vehicle is able to travel.

In step S601, the determining unit 51 determines whether there are variations in the open circuit voltages (OCV) of the battery cells that constitute the second battery 22. More specifically, the determining unit 51 determines that "there are variations" when a voltage difference (=the maximum value−the minimum value) between the minimum value and maximum value of the open circuit voltages of the respective battery cells is equal to or larger than a predetermined voltage value, and determines that "there are no variations" when the voltage difference is smaller than the predetermined voltage value. For example, the predetermined voltage value may be set to 0.02 V, in view of change in a region where the power storage amount is lower than those in the flat region in which the rate of change of the open circuit voltage with respect to the power storage amount is relatively small. When there are variations in the open circuit voltages of the respective battery cells ("YES" in S601), the control proceeds to step S602. FIG. 3B, FIG. 3C, FIG. 3D, FIG. 3E and FIG. 3F correspond to this case. When there are no variations in the open circuit voltages of the battery cells ("NO" in S601), the control proceeds to step S605. FIG. 3A corresponds to this case.

In step S602, the determining unit 51 checks the open circuit voltages of the respective battery cells that constitute the second battery 22, and determines whether there is one or more battery cells, of each of which the open circuit voltage is equal to or higher than the upper-limit voltage of the flat region. When there is one or more battery cells, of each of which the open circuit voltage is equal to or higher than the upper-limit voltage ("YES" in S602), the control proceeds to step S603. FIG. 3C, FIG. 3D, and FIG. 3F correspond to this case. When there is no battery cell of which the open circuit voltage is equal to or higher than the upper-limit voltage ("NO" in S602), the control proceeds to step S604. FIG. 3B and FIG. 3E correspond to this case.

In step S603, the determining unit 51 checks the open circuit voltages of the respective battery cells that constitute the second battery 22, and determines whether the open circuit voltages of all of the battery cells are equal to or higher than the upper-limit voltage. When the open circuit voltages of all of the battery cells are equal to or higher than the upper-limit voltage ("YES" in S603), the control proceeds to step S608. FIG. 3F corresponds to this case. When the determining unit 51 does not determine that the open circuit voltages of all of the battery cells are equal to or higher than the upper-limit voltage ("NO" in S603), the control proceeds to step S607. FIG. 3C and FIG. 3D correspond to this case.

In step S604, the determining unit 51 checks the open circuit voltages of the respective battery cells that constitute the second battery 22, and determines whether the open circuit voltages of all of the battery cells are lower than the lower-limit voltage. When the open circuit voltages of all of the battery cells are lower than the lower-limit voltage ("YES" in S604), the control proceeds to step S608. FIG. 3E corresponds to this case. When the determining unit 51 does not determine that the open circuit voltages of all of the battery cells are lower than the lower-limit voltage ("NO" in S604), the control proceeds to step S609. FIG. 3B corresponds to this case.

In step S605, the controller 52 cheeks the trip lapse flag, and determines whether the flag is ON or OFF. In this manner, a period in which the power storage amount control of the battery cells keeps being performed is determined based on the number of trips. When the trip lapse flag is ON (ON in S605), it is determined that a predetermined period has elapsed, and the control proceeds to step S606. When the trip lapse flag is OFF (OFF in S605), it is determined that the predetermined period has not elapsed, and the control proceeds to step S610.

In step S606, the determining unit 51 checks the open circuit voltages of the respective battery cells that constitute the second battery 22, and determines whether the open circuit voltages of all of the battery cells are within a range that is equal to or higher than the lower-limit voltage of the flag region, and is lower than the upper-limit voltage. When the open circuit voltages of all of the battery cells are within the range that is equal to or higher than the lower-limit voltage and lower than the upper-limit voltage (YES in S606), the control proceeds to step S611. FIG. 3A corresponds to this case. When the determining unit 51 does not determine that the open circuit voltages of all of the battery cells are within the range that is equal to or higher than the lower-limit voltage and lower than the upper-limit voltage (NO in S606), the control proceeds to step S610. This case corresponds to the case where there are no variations in the open circuit voltages of the battery cells, and there is no need to adjust the power storage amounts.

In step S607, the controller 52 determines execution of the SOC raising control, and starts the control. More specifically, a given SOC UP flag is set to ON, and a given SOC DOWN flag is set to OFF, based on the open circuit voltages of the respective battery cells that constitute the second battery 22, and an SOC up-down command state becomes "SOC UP command", based on the set states of the flags. According to the SOC UP command, the controller 52 controls the output voltage of the second DDC 21, so as to pass charge current through the second battery 22, and charge the battery cells. In the example of FIG. 4, the SOC UP flag is set to ON, based on a determination that the open circuit voltage of one of the four battery cells is 3.30 V, and the open circuit voltage of the remaining three battery cells is 3.33 V. With the flag being ON, the SOC up-down command state becomes the SOC UP command, and the second battery 22 starts being charged once the vehicle is placed in the READY-ON state. In FIG. 4, the second battery 22 is charged in the READY-ON period, so that the open circuit voltage of the above-indicated one battery cell increases from 3.30 V to 3.31 V, and the open circuit voltage of the remaining three battery cells increases from 3.33 V to 3.34 V. Once the SOC raising control is started, the control proceeds to step S701.

In step S608, the controller 52 determines execution of the SOC keeping control, and starts the control. In this embodiment, charge/discharge control is not performed for keeping the SOC; therefore, the SOC up-down command state becomes "no SOC command". Once the SOC keeping control is started, the control proceeds to step S701.

In step S609, the controller 52 determines execution of the SOC lowering control, and starts the control. More specifically, a given SOC UP flag is set to OFF, and a given SOC DOWN flag is set to ON, based on the open circuit voltages of the respective battery cells that constitute the second battery 22, and an SOC up-down command state becomes "SOC DOWN command", based on the set states of the flags. According to the SOC DOWN command, the controller 52 causes current to flow from the second battery 22, to thus discharge the battery cells. In the example of FIG. 5, the SOC DOWN flag is set to ON, based on a determination that the open circuit voltage of one of the four battery cells is 3.29 V, and the open circuit voltage of the remaining three battery cells is 3.30 V. With the flag being ON, the SOC up-down command state becomes the SOC DOWN command, and the second battery 22 starts being discharged once the vehicle is placed in the IG-OFF state. In FIG. 5, the second battery 22 is discharged during the IG-OFF period, so that the open circuit voltage of the above-indicated one battery cell decreases from 3.29 V to 3.27 V, and the open circuit voltage of the remaining three battery cells decreases from 3.30 V to 3.28 V. Once the SOC lowering control is started, the control proceeds to step S701.

In step S610, the controller 52 determines execution of the SOC keeping control, and starts the control. In this embodiment, no charge/discharge control is performed for keeping the SOC; therefore, the SOC up-down command state becomes "no SOC command". Once the SOC keeping control is started, the control proceeds to step S701.

In step S611, the controller 52 determines execution of the SOC raising control, and starts the control. More specifically, a given SOC UP flag is set to ON, and a given SOC DOWN flag is set to OFF, based on the open circuit voltages of the respective battery cells that constitute the second battery 22, and an SOC up-down command state becomes "SOC UP command", based on the set states of the flags. According to the SOC UP command, the controller 52 controls the output voltage of the second DDC 21, so as to pass charge current through the second battery 22, and charge the battery cells. Once the SOC raising control is started, the control proceeds to step S701.

Referring to FIG. 7, a process performed after the control of the power storage amounts of the battery cells is determined according to the flowchart of FIG. 6 will be described. The process of FIG. 7 is performed for transition of the control among three command states, i.e., the SOC raising control, SOC lowering control, and SOC keeping control. The flowchart of FIG. 6 is followed by the flowchart of FIG. 7 at circled "A".

In step S701, the controller 52 determines the SOC up-down command state determined in the above steps S607 to S611. The control proceeds to step S702 when the SOC up-down command state is the SOC UP command, and proceeds to step S709 when it is the SOC DOWN command, while the control proceeds to step S716 when it is the SOC KEEP command.

In step S702, the controller 52 determines, in the case of the SOC UP command, whether there is any battery cell of which the open circuit voltage has reached the upper-limit value during the SOC raising control. The control proceeds to step S703 when there is a battery cell of which the open circuit voltage has reached the upper-limit value ("YES" in S702), and proceeds to step S704 when there is no battery cell of which the open circuit voltage has reached the upper-limit value ("NO" in S702). In step S702, the controller 52 may determine, in addition to the above determination, whether the open circuit voltages of all of the battery cells have become equal to or higher than the upper-limit voltage of the flat region.

In step S703, the controller 52 stops operation of the SOC raising control. The operation can be stopped by changing a voltage value given as a command to the second DDC 21, or stopping the command. Thus, the process of FIG. 7 ends.

In step S704, the controller 52 continues operation of the SOC raising control. The operation can be continued by keeping giving the command of the voltage value which is being executed, to the second DDC 21. Then, the control proceeds to step S705.

In step S705, the controller 52 determines whether the SOC UP command should be switched to the SOC DOWN command. This determination is made for the purpose of completing the battery homogenization process in a short period of time. For example, in the case where the user repeats short-time use of the vehicle (short trip), the second battery 22 may not be sufficiently charged during "READY-ON", and it may take a considerably long time for the open circuit voltage of any battery cell to reach the upper-limit value. In this case, it is more likely to complete the battery homogenization process in a shorter period by performing the SOC lowering control, rather than by continuing the SOC raising control. Thus, the controller 52 determines whether to switch the command, based on whether the voltage difference between the minimum value and maximum value of the open circuit voltages of the respective battery cells is equal to or larger than the predetermined voltage value, and there is one or more battery cells of each of which the open circuit voltage is equal to or higher than the lower-limit voltage of the flat region and lower than the upper-limit voltage, and there is one or more battery cells of each of which the open circuit voltage is lower than the lower-limit voltage of the flat region. When the SOC UP command should be switched to the SOC DOWN command (YES in S705), the control proceeds to step S706. When the SOC UP command should not be switched to the SOC DOWN command (NO in S705), the control proceeds to step S707.

In step S706, the controller 52 switches the command from the SOC UP command to the SOC DOWN command. Then, the process of FIG. 7 ends.

In step S707, the controller 52 determines whether the SOC UP command should be switched to the SOC KEEP command. This determination is also made for the purpose of completing the battery homogenization process in a short period of time, as in the above step S705. For example, in the case where the SOC raising control is currently executed, but the SOC lowering control was also executed in the past, the battery cells in the current conditions may not be appropriately homogenized even if the SOC raising control is further continued. In this case, it may be considered better to switch to the SOC KEEP command, and see how the battery cells operate. Thus, the controller 52 determines whether to switch the command, based on whether there is any battery cell of which the open circuit voltage has reached the upper-limit value. When the command should be switched to the SOC KEEP command (YES in S707), the control proceeds to step S708. When the command should not be switched to the SOC KEEP command (NO in S707), the process of FIG. 7 ends.

In step S708, the controller 52 switches the command from the SOC UP command to the SOC KEEP command. Then, the process of FIG. 7 ends.

In step S709, the controller 52 determines, in the case of the SOC DOWN command, whether there is any battery cell of which the open circuit voltage has reached the lower-limit value during the SOC lowering control. When there is a battery cell of which the open circuit voltage has reached the lower-limit value (YES in S709), the control proceeds to step S710. When there is no battery cell of which the open circuit voltage has reached the lower-limit value (NO in S709), the control proceeds to step S711. In this step S709, the controller 52 may determine, in addition to the above determination, whether the open circuit voltages of all of the battery cells have become lower than the lower-limit voltage of the flat region.

In step S710, the controller 52 stops operation of the SOC lowering control. The operation can be stopped by stopping the command for execution of discharging after the IG-OFF. Then, the process of FIG. 7 ends.

In step S711, the controller 52 continues operation of the SOC lowering control. The operation can be continued by continuing the command for execution of discharging after the IG-OFF. Then, the control proceeds to step S712.

In step S712, the controller 52 determines whether the SOC DOWN command should be switched to the SOC UP command. This determination is made for the purpose of completing the battery homogenization process in a short period of time. For example, in the case where the SOC lowering control is performed based on the determination of the determining unit 51, but it takes time for the vehicle to be brought into the IG-OFF state, and discharging cannot be performed, it may be considered better to try to homogenize the battery cells by performing the SOC raising control. Thus, the controller 52 determines whether to switch the command, based on whether the voltage difference between the minimum value and maximum value of the open circuit voltages of the respective battery cells is equal to or larger than the predetermined voltage value, and there is one or more battery cells of each of which the open circuit voltage is equal to or higher than the upper-limit voltage of the flat region, or whether the open circuit voltages of all of the battery cells are equal to or higher than the lower-limit voltage of the flat region and lower than the upper-limit voltage, and the trip lapse flag is ON. When the command should be switched to the SOC UP command (YES in S712), the control proceeds to step S713. When the command should not be switched to the SOC UP command (NO in S712), the control proceeds to step S714.

In step S713, the controller 52 switches the command from the SOC DOWN command to the SOC UP command. Then, the process of FIG. 7 ends.

In step S714, the controller 52 determines whether the SOC DOWN command should be switched to the SOC KEEP command. This determination is also made for the purpose of completing the battery homogenization process in a short period of time, as in the above step S712. For example, in the case where the SOC lowering control is currently executed, but the SOC raising control was also executed in the past, the battery cells in the current conditions may not be appropriately homogenized even if the SOC lowering control is further continued. In this case, it may be considered better to perform the SOC keeping control, and see how the battery cells operate. Thus, the controller 52 determines whether to switch the command, based on whether the open circuit voltages of all of the battery cells are lower than the lower-limit voltage of the flat region, or whether there is any battery cell of which the open circuit voltage has reached the lower-limit value. The control proceeds to step S715 when the command should be switched to the SOC KEEP command (YES in S714), and the process of FIG. 7 ends when the command should not be switched to the SOC KEEP command (NO in S714).

In step S715, the controller 52 switches the command from the SOC DOWN command to the SOC KEEP command. Then, the process of FIG. 7 ends.

In step S716, the controller 52 determines whether the SOC DOWN command was generated in the last cycle, and the second battery 22 is currently in a condition where the SOC lowering control can be performed. The controller 52 determines whether the SOC lowering control can be performed, based on whether the voltage difference between the minimum value and maximum value of the open circuit voltages of the respective battery cells is equal to or larger than the predetermined voltage value, and there is one or more battery cells of each of which the open circuit voltage is equal to or higher than the lower-limit voltage of the flat region and lower than the upper-limit voltage, and there is one or more battery cells of each of which the open circuit voltage is lower than the lower-limit voltage of the flat region. When the SOC DOWN command was generated in the last cycle, and the second battery 22 is currently in a condition where the SOC lowering control can be performed (YES in S716), the control proceeds to step S717. In the other cases (NO in S716), the control proceeds to step S718.

In step S717, the controller 52 switches the command from the SOC KEEP command to the SOC DOWN command. Then, the process of FIG. 7 ends.

In step S718, the controller 52 determines whether the SOC UP command was generated in the last cycle, and the second battery 22 is currently in a condition where the SOC raising control can be performed. The controller 52 determines whether the SOC raising control can be performed, based on whether the voltage difference between the minimum value and maximum value of the open circuit voltages of the respective battery cells is equal to or larger than the predetermined voltage value, and there is one or more battery cells of each of which the open circuit voltage is equal to or higher than the upper-limit voltage of the flat region. When the SOC command was generated in the last cycle, and the second battery 22 is currently in a condition where the SOC raising control can be performed (YES in S718), the control proceeds to step S719. In the other cases (NO in S718), the process of FIG. 7 ends.

In step S719, the controller 52 switches the command from the SOC KEEP command to the SOC UP command. Then, the process of FIG. 7 ends.

(2) Trip Number Control

Referring to FIG. 8, a process of controlling the number of trips used in determination on transition from the state of the SOC lowering control or SOC keeping control to the SOC raising control will be described. In this process, a trip counter for counting the number of trips is used. The process shown in FIG. 8 is started when the vehicle is placed in the READY-ON state in which the vehicle can travel.

Once the process starts, the controller 52 increments the number of trips counted with the trip counter, by one, in step S801. At this time, the SOC up-down command state established in the last cycle may be set as the initial value, before step S601 of FIG. 6 is started. Then, the control proceeds to step S802.

In step S802, the controller 52 determines whether the number of trips has reached a predetermined count value. When the number of trips has reached the predetermined count value ("YES" in S802), the control proceeds to step S803. When the number of trips has not reached the predetermined count value ("NO" in S802), the control proceeds to step S805.

In step S803, the controller 52 clears the number of trips of the trip counter to zero. After clearing the number of trips, the control proceeds to step S804.

In step S804, the controller 52 sets the trip lapse flag to ON. Then, the process of FIG. 8 ends.

In step S805, the controller 52 sets the trip lapse flag to OFF. Then, the process of FIG. 8 ends.

In the above step S802, the controller 52 may determine that the number of trips has reached the predetermined count value, when the count value becomes a multiple of a given numerical value. In this case, there is no need to clear the number of trips of the trip counter in the above step S803.

(3) Battery Homogenization Process

Referring to FIG. 9, a process of homogenizing the battery cells that constitute the second battery 22 will be described. The process shown in FIG. 9 is intermittently started in predetermined timing, when the vehicle is placed in the IG-OFF state in which the vehicle is not able to travel.

In step S901, the processor 53 obtains the minimum open circuit voltage (which will be called "minimum OCV"), out of the open circuit voltages (OCV) of the battery cells that constitute the second battery 22. Once the minimum OCV is obtained, the control proceeds to step S902.

In step S902, the processor 53 selects one battery cell (which will be called "subject battery cell") from the batter cells. Once the subject battery cell is selected, the control proceeds to step S903.

In step S903, the processor 53 determines whether the subject battery cell is the battery cell having the minimum OCV. When the subject battery cell is the battery cell having the minimum OCV ("YES" in S903), the control proceeds to step S906. When the subject battery cell is not the battery cell leaving the minimum OCV ("NO" in S903), the control proceeds to step S904.

In step S904, the processor 53 determines whether a voltage difference between the open circuit voltage of the subject battery cell and the minimum OCV is smaller than a predetermined value. When the voltage difference is smaller than the predetermined value ("YES" in S904), the control proceeds to step S906. When the voltage difference is not smaller than the predetermined value ("NO" in S904), the control proceeds to step S905.

In step S905, the processor 53 performs homogenizing operation on the subject battery cell. For example, a certain discharge circuit provided in the subject battery cell is activated, so that the homogenizing operation is performed.

In step S906, the processor 53 does not perform homogenizing operation on the subject battery cell. For example, a certain discharge circuit provided in the subject battery cell is not activated, so that the homogenizing operation is not performed.

The process of the above steps S902 to S906 is repeatedly executed, with respect to all of the battery cells that constitute the second battery 22, such that each of the battery cells is sequentially selected as the subject battery cell. The process of FIG. 9 ends when homogenization is completed with respect to all of the battery cells.

Figure 10:
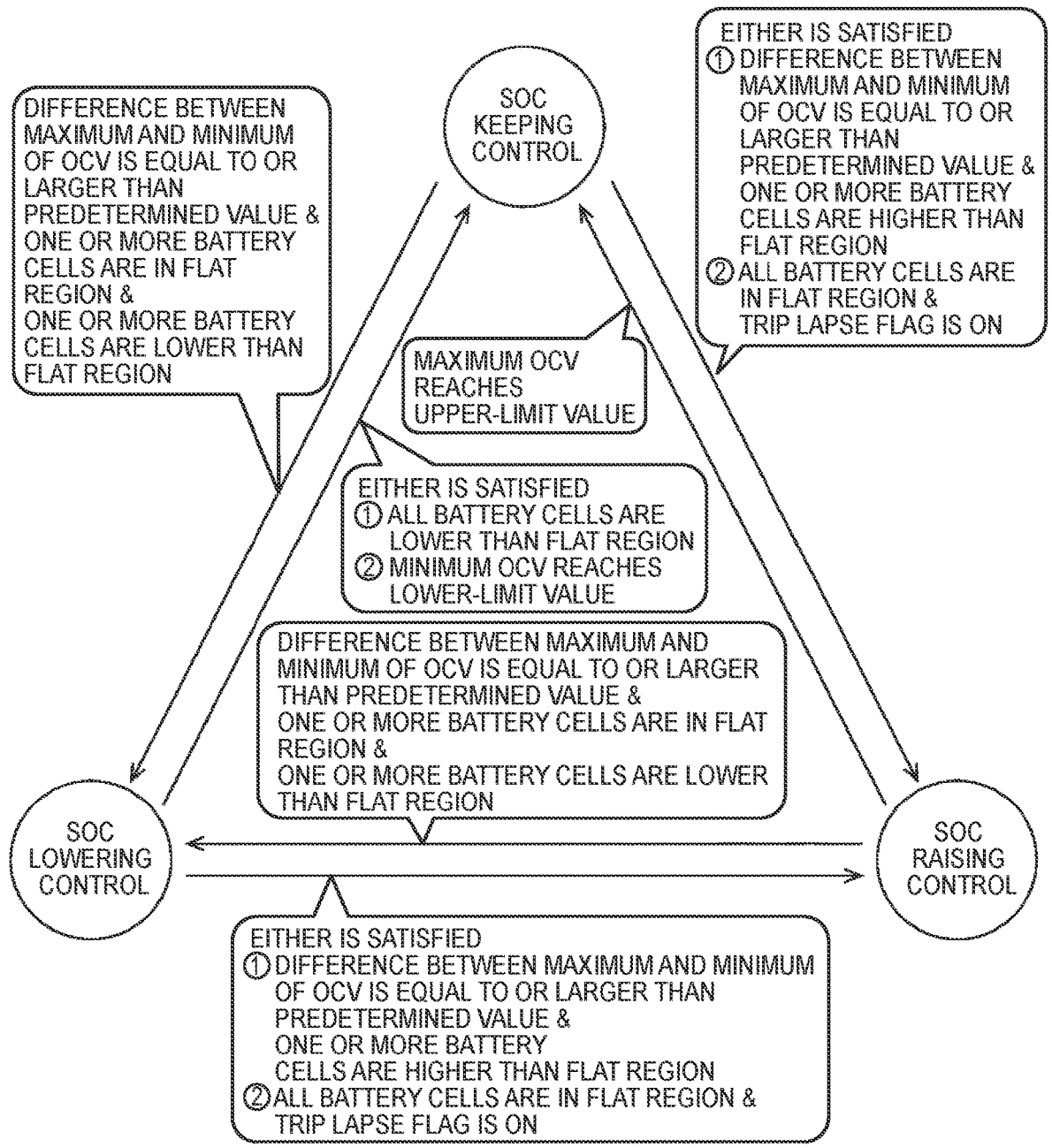
FIG. 10 is a view showing transition among three states of SOC raising, SOC lowering, and SOC keeping.

FIG. 10 illustrates transitions among three states of the SOC raising control, SOC lowering control, and SOC keeping control.

A transition from the SOC keeping control to the SOC raising control is made, under conditions that the voltage difference between the minimum value and maximum value of the open circuit voltages of the respective battery cells is equal to or larger than the predetermined voltage value, and there is one or more battery cells of each of which the open circuit voltage is equal to or higher than the upper-limit voltage of the flat region. Alternatively, a transition from the SOC keeping control to the SOC raising control is made, under conditions that the open circuit voltages of all of the battery cells are equal to or higher than the lower-limit voltage of the flat region and lower than the upper-limit voltage, and the trip lapse flag is ON. On the other hand, a transition from the SOC keeping control to the SOC lowering control is made, under conditions that the voltage difference between the minimum value and maximum value of the open circuit voltages of the respective battery cells is equal to or larger than the predetermined voltage value, and there is one or more battery cells of each of which the open circuit voltage is equal to or higher than the lower-limit voltage of the flat region and is lower than the upper-limit voltage, and there is one or more battery cells of each of which the open circuit voltage is lower than the lower-limit voltage of the flat region.

A transition from the SOC raising control to the SOC lowering control is made, under conditions that the voltage difference between the minimum value and maximum value of the open circuit voltages of the respective battery cells is equal to or larger than the predetermined voltage value, and there is one or more battery cells of each of which the open circuit voltage is equal to or higher than the lower-limit voltage of the flat region and is lower than the upper-limit voltage, and there is one or more battery cells of each of which the open circuit voltage is lower than the lower-limit voltage of the flat region. On the other hand, a transition from the SOC raising control to the SOC keeping control is made, under a condition that there is any battery cell of which the open circuit voltage has reached the upper-limit value. The determination on transition from the SOC raising control to the SOC lowering control is given a higher priority than the determination on transition from the SOC raising control to the SOC keeping control.

A transition from the SOC lowering control to the SOC raising control is made, under conditions that the voltage difference between the minimum value and maximum value of the open circuit voltages of the respective battery cells is equal to or larger than the predetermined voltage value, and there is one or more battery cells of each of which the open circuit voltage is equal to or higher than the upper-limit voltage of the flat region. Alternatively, a transition from the SOC lowering control to the SOC raising control is made, under conditions that the open circuit voltages of all of the battery cells are equal to or higher than the lower-limit voltage of the flat region and lower than the upper-limit voltage, and the trip lapse flag is ON. On the other hand, a transition from the SOC lowering control to the SOC keeping control is made, under a condition that the open circuit voltages of all of the battery cells are lower than the lower-limit voltage of the flat region. Alternatively, a transition from the SOC lowering control to the SOC keeping control is made, under a condition that there is any battery cell of which the open circuit voltage has reached the lower-limit value. The determination on transition from the SOC lowering control to the SOC raising control is given a higher priority than the determination on transition from the SOC lowering control to the SOC keeping control.

In the illustrated embodiments, electric power discharged so as to lower the power storage amount of each battery cell under the SOC lowering control is discarded in principle and wasted. As a method for not wasting the power discharged from each battery cell, it may be considered to charge the first battery 12 with the power. In this method, the battery control device 50 brings the first relay device 41 and the second relay device 42 into the conducting states, based on determination of execution of the SOC lowering control, and a path through which electric power is transferred from the second battery 22 to the first battery 12 is formed. In order to prevent the first battery 12 from being excessively charged, the battery control device 50 may cause the determining unit 51 to determine whether the power storage amount of the first battery 12 is equal to or smaller than a predetermined value (third determination), and may cause the controller 52 to determine execution of the SOC lowering control, when the power storage amount of the first battery 12 is equal to or smaller than the predetermined value.

The determination as to whether the power storage amount of the first battery 12 is equal to or smaller than the predetermined value may be included in step S604 of FIG. 6, steps S705 and S717 of FIG. 7, and conditions for transition from the SOC raising control and the SOC keeping control to the SOC lowering control in FIG. 10.

As described above, when the open circuit voltage(s) (OCV) of at least one battery cell of the battery cells that constitute the second battery 22 is/are equal to or higher than the lower-limit voltage of the flat region and lower than the upper-limit voltage, the battery control device 50 according to one embodiment of the disclosure executes the SOC raising control for raising the power storage amounts (SOC) all of the battery cells at the same time, or executes the SOC lowering control for lowering the power storage amounts of all of the battery cells at the same time.

With the above control, the battery cell or cells placed in the flat region in which the power storage amount cannot be uniquely specified from the open circuit voltage can be brought into a condition where the battery cell is taken out of the flat region. The homogenization process can be efficiently performed on the battery cells placed outside the flat region, since the power storage amount of each of these battery cells can be uniquely specified from the open circuit voltage. Thus, chances of efficiently performing the battery homogenization process can be increased through the SOC raising control or SOC lowering control, and the states of charge of the respective battery cells are made uniform with high accuracy, so that the performance of the battery assembly can be prevented from deteriorating.

The SOC-OCV characteristic curve of the LFP battery has a larger inclination on the high voltage side on which the open circuit voltage exceeds the upper-limit voltage of the flat region, than that on the low voltage side on which the open circuit voltage is lower than the lower-limit voltage of the flat region (see FIG. 2). Thus, in this embodiment, when the open circuit voltage(s) of at least one battery cell is/are equal to or higher than the upper-limit voltage of the flat region, the SOC raising control is executed, so as to raise the open circuit voltages of all of the battery cells. In this manner, the battery homogenization process can be performed with high accuracy. On the other hand, when the open circuit voltages of all of the battery cells are lower than the upper-limit voltage of the flat region, and the open circuit voltage(s) of at least one battery cell is/are lower than the lower-limit voltage of the flat region, the SOC lowering control is executed, so as to lower the open circuit voltages of all of the battery cells, because it is easier to bring all of the battery cells to the low voltage side, than to the high voltage side. Thus, the battery homogenization process can be completed in a short period of time, though the accuracy is poorer than that at the time of the SOC raising control.

While one embodiment of the disclosure in the form of the battery control device has been described above, the disclosure may also be regarded as a vehicular power supply system including the battery control device, a method executed by the battery control device for controlling the power storage amounts of the battery cells, a power storage amount control program and a non-temporary recording medium that can be read by a computer that stores the program, or a vehicle on which the battery control device is installed.

The battery control device of the disclosure can be used in a vehicle on which a redundant power supply system having two power supply systems is installed.

What is claimed is:

1. A battery control device that controls a battery assembly, the battery control device comprising:
   a processor programmed to:
      perform a first determination of whether a voltage difference between a minimum value and a maximum value of open circuit voltages of a plurality of battery cells of the battery assembly is equal to or larger than a predetermined voltage value, each of the battery cells having an SOC-OCV characteristic curve including a flat region in which a rate of change of an open circuit voltage with respect to a power storage amount is smaller than that in an adjacent region;
      perform a second determination of whether the open circuit voltage of each of the battery cells is lower than a lower-limit voltage of the flat region, or is equal to or higher than the lower-limit voltage and lower than an upper-limit voltage of the flat region, or is higher than the upper-limit voltage;
      execute control for raising power storage amounts of the battery cells, when the processor determines that: (1) the voltage difference is equal to or larger than the predetermined value; (2) the open circuit voltage of at least one of the battery cells is equal to or higher than the upper-limit voltage, and (3) the open circuit voltage of at least another one of the battery cells is lower than the upper-limit voltage; and
      after performing the first determination and the second determination, execute control for homogenizing the power storage amounts of the battery cells controlled by the controller.

2. The battery control device according to claim 1, wherein the processor is programmed to:
   start a count upon a trip counter being reset; and
   when the count reaches a predetermined count value and the processor determines that the voltage difference is smaller than the predetermined value and the open circuit voltages of all of the battery cells are equal to or higher than the lower-limit voltage and lower than the upper-limit voltage, perform the control for raising the power storage amounts of the battery cells.

3. The battery control device according to claim 1, wherein the processor performs control for keeping the power storage amounts of the battery cells, when the processor determines that the voltage difference is equal to or larger than the predetermined value, and the processor determines that the open circuit voltages of all of the battery cells are lower than the lower-limit voltage or higher than the upper-limit voltage.

4. The battery control device according to claim 1, wherein the processor performs control for lowering the power storage amounts of the battery cells, when the processor determines that the voltage difference is equal to or larger than the predetermined value, and the processor determines that the open circuit voltage of at least one of the battery cells is equal to or higher than the lower-limit voltage and lower than the upper-limit voltage, and the open circuit voltages of all the plurality of the battery cells other than the at least one of the battery cells are lower than the lower-limit voltage.

5. The battery control device according to claim 4, wherein the processor is programmed to:
   perform a third determination of a power storage amount of a battery to which electric power discharged from the battery cells under the control for lowering the power storage amounts of the battery cells is allowed to be transferred; and
   execute the control for lowering the power storage amounts of the battery cells by transferring electric power to the battery, based on the results of the first and second determinations, when the processor determines that the power storage amount of the battery is equal to or smaller than a predetermined value.

* * * * *